(12) United States Patent
Tseng et al.

(10) Patent No.: US 7,766,410 B2
(45) Date of Patent: Aug. 3, 2010

(54) FUEL FILLER DOOR INTERLOCK ASSEMBLY

(75) Inventors: Teru Tseng, Troy, MI (US); James A. Rochon, Sterling Heights, MI (US); Eric A. Watterworth, Orion, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 640 days.

(21) Appl. No.: 11/737,816

(22) Filed: Apr. 20, 2007

(65) Prior Publication Data

US 2008/0258552 A1    Oct. 23, 2008

(51) Int. Cl.
*B60K 15/05*    (2006.01)
(52) U.S. Cl. .................................... 296/97.22
(58) Field of Classification Search ............. 296/97.22, 296/155; 49/449
See application file for complete search history.

(56) References Cited

U.S. PATENT DOCUMENTS 4,620,744 A * 11/1986 Yui et al. ................... 296/155
5,454,618 A * 10/1995 Sullivan ................... 296/97.22
5,520,431 A *  5/1996 Kapes et al. .............. 296/97.22
5,538,312 A *  7/1996 Lehmkuhl ................ 296/97.22
5,676,416 A * 10/1997 Cooper .................... 296/97.22
5,769,481 A *  6/1998 Cooper .................... 296/97.22
6,007,141 A * 12/1999 Thomas et al. ............. 296/155
6,199,938 B1 *  3/2001 Choi ......................... 296/155
6,808,226 B2 * 10/2004 Hirano ...................... 296/155
6,955,389 B2 * 10/2005 Suzuki et al. ............ 296/146.4
7,525,272 B2 *  4/2009 Oh ............................. 318/466
7,537,269 B2 *  5/2009 Tseng et al. ................ 296/155

FOREIGN PATENT DOCUMENTS

KR            656754 B1 * 12/2006

* cited by examiner

*Primary Examiner*—H Gutman
(74) *Attorney, Agent, or Firm*—Quinn Law Group, PLLC

(57) ABSTRACT

An interlock assembly is provided for a vehicle having a body with a selectively openable slidable door and a selectively openable fuel filler door mounted thereto. The fuel filler door is operatively connected with the interlock assembly. The interlock assembly has a first interlock state, operable to restrict the opening of the slidable door when the fuel filler door is in an open position, and a second interlock state, operable to restrict the opening of the fuel filler door when the slidable door is in an open position. Preferably, the interlock assembly is mounted with respect to a rear jamb formed by the body.

16 Claims, 2 Drawing Sheets

FUEL FILLER DOOR INTERLOCK ASSEMBLY

TECHNICAL FIELD

The present invention relates to an interlock assembly for a vehicle operable to restrict or prevent the opening of a selectively openable slidable door when a selectively openable fuel filler door is in the open position and to restrict or prevent the opening of the selectively openable fuel filler door when the selectively openable slidable door is in the open position.

BACKGROUND OF THE INVENTION

Van or van-type vehicles typically include a selectively openable slidable door mounted on tracks by which the door slides rearward to permit access to an interior passenger compartment. Typically, a fuel filler door is mounted with respect to a side wall of the vehicle to conceal a fuel filler cap. When the slidable door is open, the fuel filler door is inaccessible. However, when the slidable door is closed, the fuel filler door may be opened to access the fuel filler cap. An inadvertent opening of the slidable door when the fuel filler door is open, such as when fueling the vehicle, may cause the slidable door to interfere with the fuel filler door and possibly cause damage to the fuel filler door and/or slidable door. Various interlock assemblies have been developed to selectively lock or maintain the slidable door in the closed position or limit the travel of the slidable door when the fuel filler door is in the open position.

SUMMARY OF THE INVENTION

An interlock assembly is provided for a vehicle having a body with a selectively openable slidable door and a selectively openable fuel filler door mounted thereto. The fuel filler door is operatively connected with the interlock assembly. The interlock assembly includes a bracket member and a bell crank member pivotably mounted with respect to the bracket member. A pin is slidably disposed with respect to the bracket member and is movable between an extended position and a retracted position. The bell crank member is operable to urge the pin into the extended position when the fuel filler door is open and the retracted position when the fuel filler door is closed. The pin operates to engage a bore defined by the slidable door when in the extended position to substantially lock the slidable door. The interlock assembly further includes a locking arm engageable with the bell crank member to substantially prevent the opening of the fuel filler door when the slidable door is open. Preferably, the interlock assembly is mounted with respect to a rear jamb formed by the body.

The interlock assembly may further include a cable having a first end. Additionally, the bell crank member may include a first arm portion and a second arm portion. Preferably, the first end of the cable is mounted with respect to the first arm portion and the second arm portion is engaged with the pin. The cable operates to bias the bell crank member to urge the pin into the extended position. The cable may further include a second end mounted with respect to the fuel filler door. A torsion spring may be mounted with respect to the bell crank member and operate to bias the bell crank member to urge the pin into the retracted position. A vehicle incorporating the interlock assembly of the present invention is also disclosed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
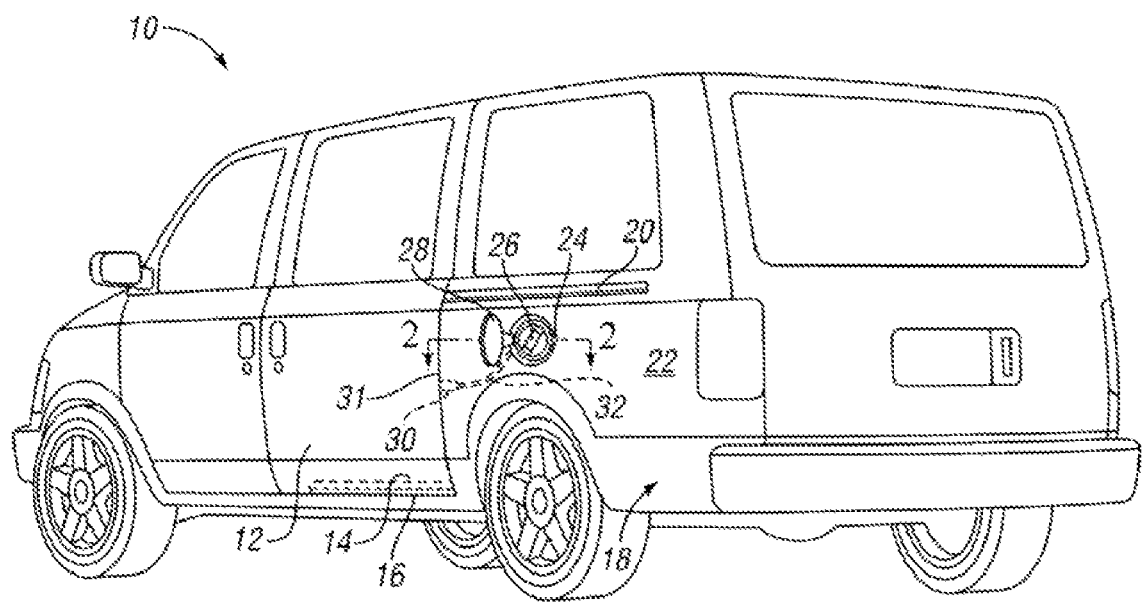
FIG. 1 is a perspective view of a van-type vehicle having a body and a selectively openable slidable door and fuel filler door incorporating an interlock assembly consistent with the invention.

Referring to the drawings wherein like reference numbers correspond to like or similar components throughout the several figures, there is shown in FIG. 1 a vehicle 10, such as a van, having a selectively openable slidable door 12. The slidable door 12 is slidable between its open and closed positions via a floor track 14 mounted with respect to the floor sill 16 of a body 18 of the vehicle 10 and a second track 20 which is mounted with respect to an outer side wall 22 of the body 18.

As shown in FIG. 1, a fuel filler opening 24 is defined by the side wall 22 of the vehicle body 18 to provide access to a fuel filler cap 26. A selectively openable fuel filler door 28 is pivotably mounted with respect to the vehicle body 18 and operates to selectively close the fuel filler opening 24. The fuel filler door 28 is operatively connected to an interlock assembly 30, shown schematically in FIG. 1, through a cable 32. The construction and operation of the interlock assembly 30 will be described in greater detail hereinbelow with reference to FIGS. 3 and 4. With the fuel filler door 28 pivoted to the open position, as shown in FIG. 1, the potential for damage to the fuel filler door 28 and/or the slidable door 12 is increased should the slidable door 12 be moved from the closed position, as shown in FIG. 1, to the open position. As such, the interlock assembly 30 is provided to restrict or prevent the opening of the slidable door 12 when the fuel filler door 28 is in the open position, corresponding to a first interlock state, and to restrict or prevent the opening of the fuel filler door 28 when the slidable door 12 is in the open position, corresponding to a second interlock state. Alternately, the interlock assembly 30 will allow the slidable door 12 to open when the fuel filler door 28 is in the closed position. The interlock assembly 30 is preferably mounted with respect to a rear jam 31 of the vehicle body 18. This placement of the interlock assembly 30 enables the length of cable 32, operatively interconnecting the fuel filler door 28 with the interlock assembly 30, to be reduced.

Figure 2:
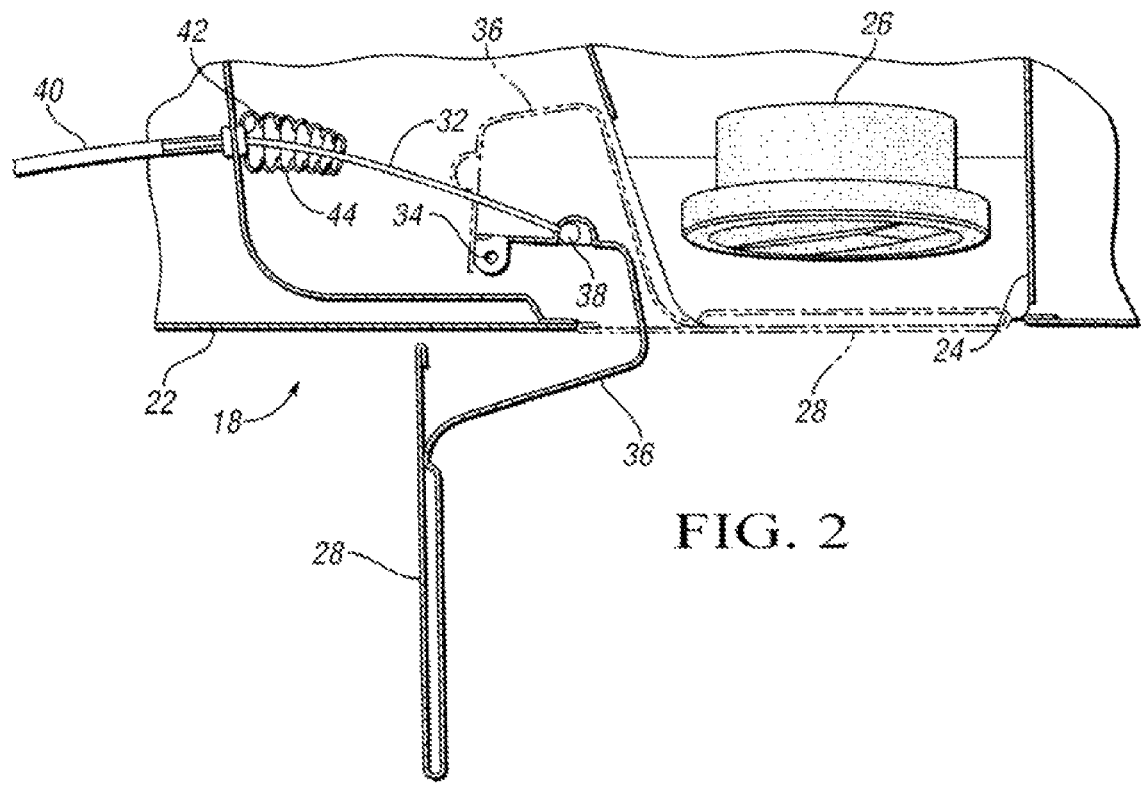
FIG. 2 is a partial cross sectional view, taken along line 2-2 of FIG. 1, of the vehicle body illustrating the operation of the fuel filler door.

Referring now to FIG. 2, and with continued reference to FIG. 1, there is shown a partial cross sectional view, taken along line 2-2 of FIG. 1, illustrating the operation of the fuel filler door 28. The fuel filler door 28 is pivotably mounted with respect to the vehicle body 18 by a pivot shaft 34 through a support arm 36. The support arm 36 is sufficiently configured to retain a cable end 38 of the cable 32. The cable 32 is preferably at least partially housed within a sheath 40 to provide a measure of protection thereto. The support arm 36 operates to tension the cable 32 when the fuel filler door 28 is pivoted from the closed position, shown in FIG. 2 with phantom lines, to the open position, shown in FIG. 2 with solid lines. A grommet or bushing 42 is provided to reduce the likelihood of damage to the cable 32 where the cable 32 passes through the vehicle body 18. Additionally, those skilled in the art will recognize that a boot 44 may be provided to prevent the infiltration of debris or other contaminates between the sheath 40 and the cable 32, thereby further tending to increase the reliability of the cable 32.

Figure 3:
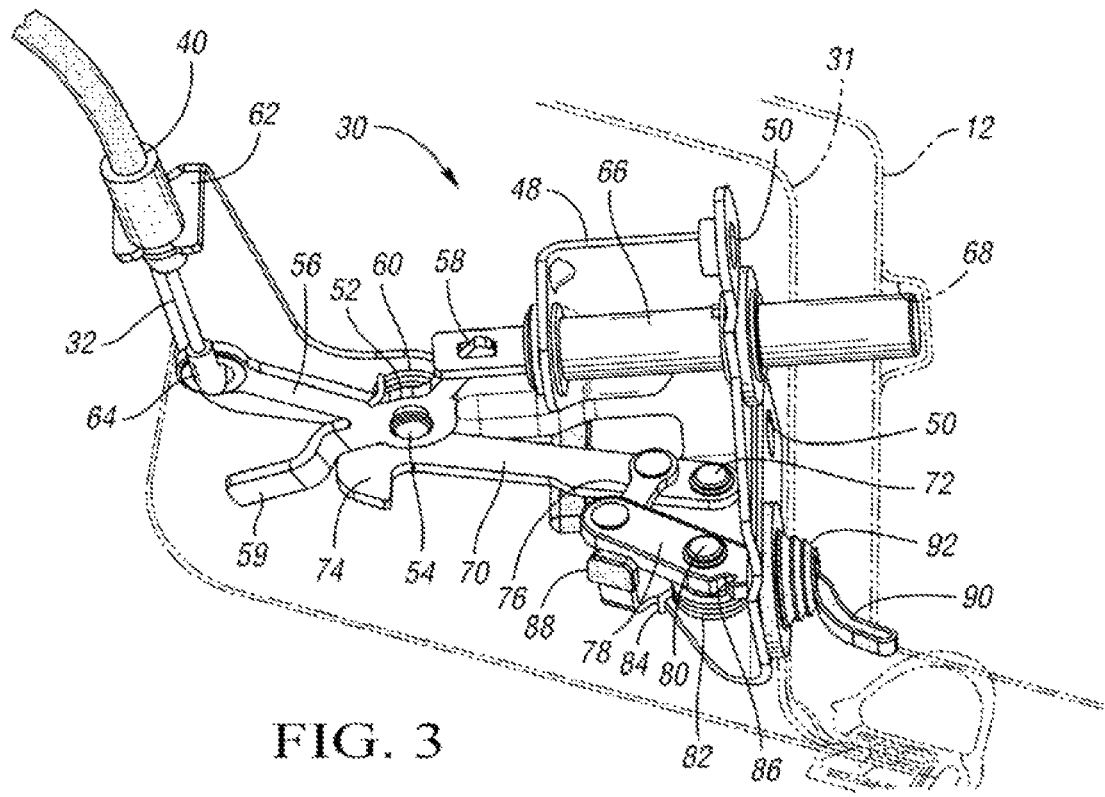
FIG. 3 is a perspective view of the interlock assembly, schematically illustrated in FIG. 1, shown in a first interlock state to restrict the opening of the selectively openable slidable door when the selectively openable fuel filler door is in an open position.
Figure 4:
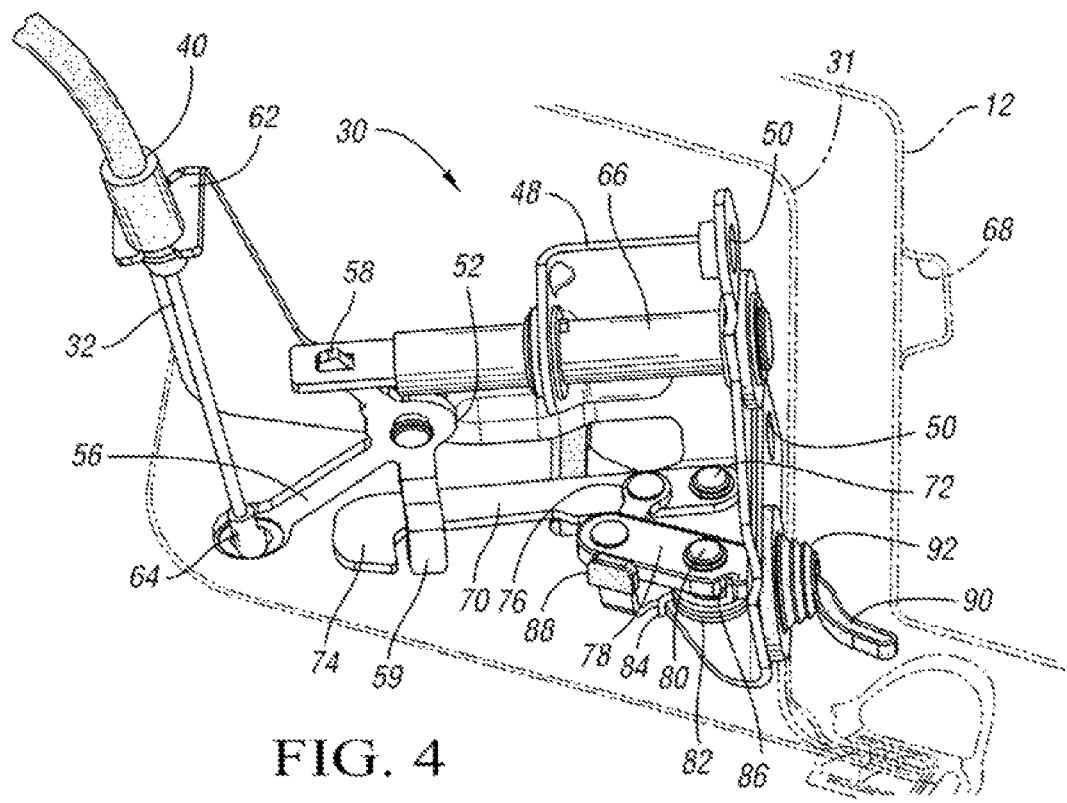
FIG. 4 is a perspective view of the interlock assembly of FIG. 3 shown in a second interlock state to restrict the opening of the selectively openable fuel filler door when the selectively openable slidable door is in an open position.

Referring now to FIGS. 3 and 4, and with continued reference to FIGS. 1 and 2, there is shown the interlock assembly 30 of the present invention configured to be mounted with respect to the rear jamb 31 via a plurality of fasteners, not shown. A bracket member 48 defines a plurality of bores 50 that are sufficiently configured to receive a respective one of the plurality of fasteners. The bracket member 48 has a bell crank member 52 pivotably mounted thereto via a shaft 54. The bell crank member 52 includes a first arm portion 56, a second arm portion 58, and a third arm portion 59. A torsion spring member 60 is coaxially disposed with respect to the shaft 54 and includes a first end portion, not shown, engaged with the second arm portion 58 and a second end portion, not shown, engaged with the bracket member 48. The torsion spring member 60 operates to bias the bell crank member 52 in a counterclockwise direction, as viewed in FIGS. 3 and 4. The bracket member 48 includes a cable retention arm portion 62 operable to retain the sheath 40 with respect to the bracket member 48 and to allow translational movement of the cable 32 with respect to the bracket member 48. The cable 32 includes a cable end 64 engaged with the first arm portion 56 of the bell crank member 52. The cable 32 operates to bias the bell crank member 52 in the clockwise direction, as viewed in FIGS. 3 and 4, against the bias force of the torsion spring member 60.

A bolt or pin 66 is slidably disposed with respect to the bracket member 48. The pin 66 has an extended position, as shown in FIG. 3, and a retracted position, as shown in FIG. 4. The second arm portion 58 of the bell crank member 52 operates to selectively bias the pin 66 into the extended and retracted positions. The slidable door 12 defines a bore 68 sufficiently configured to selectively receive at least a portion of the pin 66 therein. With a portion of the pin 66 disposed within the bore 68, as shown in FIG. 3, the movement of the slidable door 12 with respect to the vehicle body 18 is substantially restricted or prevented. That is, the slidable door 12 will be locked in the closed position as shown in FIG. 1.

A selectively engageable locking arm 70 is movable between an unlocked position, as shown in FIG. 3, and a locked position as shown in FIG. 4. The locking arm 70 is pivotably mounted with respect to the bracket member 48 by a pin 72. A hook portion 74 is provided on the locking arm 70 opposite the pin 72 and is configured to selectively engage the third arm portion 59 of the bell crank member 52 to selectively restrict or prevent the movement thereof. A link member 76 interconnects the locking arm 70 with a lever member 78. The lever member 78 is pivotably mounted to the bracket member 48 by a pin 80. A torsion spring 82 is coaxially disposed about the pin 80 and includes a first end portion 84, in engagement with the bracket member 48, and a second end portion 86, in engagement with the lever member 78. A stop 88 is formed by the bracket member 48 and operates to limit the travel of the lever member 78 and consequently the locking arm 74. The torsion spring 82 operates to bias the lever member 78 toward the stop 88, thereby urging the locking arm 70 toward the locked position. An arm portion 90 of the lever member 78 extends through the rear jamb 31 and is configured to engage the slidable door 12, as shown in FIG. 3, when the slidable door 12 is in the closed position. A boot 92 is provided to sealingly engage the arm portion 90 of the lever member 78 thereby preventing foreign materials, such as dirt and water, from traversing the rear jamb 31 and contacting the interlock assembly 30.

In operation, with the slidable door 12 in the closed position, the slidable door 12 contacts the arm portion 90 of the lever member 78 thereby biasing the lever member 78 against the force of the torsion spring 82. In so doing, the hook portion 74 of the locking arm 70 is biased out of engagement with the third arm portion 59 of the bell crank member 52 to allow rotation thereof. As the fuel filler door 28 is opened, the support arm 36 will tension or pull the cable 32 via cable end 38. As the cable 32 is pulled within the sheath 40, the cable end 64 will urge the bell crank member 52 to rotate in the clockwise direction against the bias force of the torsion spring member 60. The clockwise rotation of the bell crank member 52 will cause the second arm portion 58 of the bell crank member 52 to bias the pin 66 into the extended position thereby engaging the bore 68, as shown in FIG. 3, to place the interlock assembly in the first interlock state. As stated hereinabove, with the pin 66 in the extended position, the movement of the slidable door 12 with respect to the vehicle body 18 is substantially restricted. This is especially beneficial since the opening of the slidable door 12 when the fuel filler door 28 is open, such as when refueling, may cause damage to the slidable door 12 and/or the fuel filler door 28.

As the fuel filler door 28 is closed, the tension exerted on the cable 32 by the support arm 36 is substantially reduced. As such, the torsion spring member 60 will bias the bell crank member 52 in the counterclockwise direction thereby causing the second arm portion 58 to bias the pin 66 into the retracted position, as shown in FIG. 4. With the pin 66 in the retracted position, the slidable door 12 is free to move with respect to the vehicle body 18. This is advantageous since the possibility of interference between the slidable door 12 and the fuel filler door 28 is eliminated with the fuel filler door 28 in the closed position.

The second interlock state of the interlock assembly 30 is illustrated in FIG. 4. With the slidable door 12 in the open position, the interlock assembly 30 will prevent the opening of the fuel filler door 28. As the slidable door 12 moves from the closed position to the open position, it is moved out of engagement with the arm portion 90 of the lever member 78. As a result the torsion spring 82 biases the lever member 78 against the stop 88, thereby urging the locking arm 70, via the link 76, into the locked position, as shown in FIG. 4. With the locking arm 70 in the locked position, the clockwise rotation of the bell crank member 52 is restricted and the fuel filler door 28 is prevented from opening as a result.

While the best modes for carrying out the invention have been described in detail, those familiar with the art to which this invention relates will recognize various alternative designs and embodiments for practicing the invention within the scope of the appended claims.

The invention claimed is:

1. An interlock apparatus for a vehicle having a body with a selectively openable slidable door and a selectively openable fuel filler door mounted thereto, the fuel filler door being operatively connected with the interlock apparatus, the interlock apparatus comprising:

an interlock assembly mounted with respect to the body and operatively connected to the fuel filler door;

wherein said interlock assembly has a first interlock state operable to restrict the opening of the slidable door when the fuel filler door is in an open position;
wherein said interlock assembly has a second interlock state operable to restrict the opening of the fuel filler door when the slidable door is in an open position: and
wherein said interlock assembly further includes:
a bracket member;
a bell crank member pivotably mounted with respect to said bracket member;
a pin slidably disposed with respect to said bracket member and movable between an extended position and a refracted position;
wherein said bell crank member is operable to urge said pin into said extended position when the fuel filler door is open and said retracted position when the fuel filler door is closed; and
wherein said pin engages a bore defined by the slidable door when in said extended position to substantially lock the slidable door.

2. The interlock apparatus of claim 1, wherein said interlock assembly further includes:
a locking arm in selective locking engagement with said bell crank member;
a lever member operatively connected to said locking arm and in selective contact with the slidable door;
wherein the slidable door is configured to engage said lever member to bias said locking arm out of locking engagement with said bell crank member when the slidable door is in the closed position;
wherein said locking arm is biased into locking engagement with said bell crank member when the slidable door is in the open position to substantially prevent the opening of the fuel filler door.

3. The interlock apparatus of claim 1, wherein said interlock assembly further includes:
a cable having a first end and a second end;
wherein said bell crank member includes a first arm portion and a second arm portion;
wherein said first end of said cable is mounted with respect to said first arm portion;
wherein said second end is operatively connected to the fuel filler door;
wherein said second arm portion is engaged with said pin; and
wherein said cable is operable to bias said bell crank member to urge said pin into said extended position.

4. The interlock apparatus of claim 3, wherein said interlock assembly further includes:
a third arm portion provided on said bell crank member;
wherein said locking arm is configured to selectively engage said third arm portion to substantially limit the movement of said bell crank member; and
wherein said cable is operable to substantially prevent the opening of the fuel filler door when said locking arm engages said third arm member.

5. The interlock apparatus of claim 1, wherein the body defines a rear jamb, said interlock assembly being mounted with respect to the rear jamb.

6. An interlock assembly for a vehicle having a body with a selectively openable slidable door and a selectively openable fuel filler door mounted thereto, the fuel filler door being operatively connected with the interlock assembly, the interlock assembly comprising:
a bracket member;
a bell crank member pivotably mounted with respect to said bracket member;
a pin slidably disposed with respect to said bracket member and movable between an extended position and a retracted position;
a locking arm configured to selectively engage said bell crank member to limit the movement of said bell crank member;
wherein said bell crank member is operable to urge said pin into said extended position when the fuel filler door is open and said retracted position when the fuel filler door is closed;
wherein said pin engages a bore defined by the slidable door when in said extended position to substantially lock the slidable door; and
wherein said locking arm engages said bell crank member to substantially prevent the opening of the fuel filler door when the slidable door is open.

7. The interlock assembly of claim 6, further comprising:
a cable having a first end;
wherein said bell crank member includes a first arm portion and a second arm portion;
wherein said first end of said cable is mounted with respect to said first arm portion;
wherein said second arm portion is engaged with said pin; and
wherein said cable is operable to bias said bell crank member to urge said pin into said extended position.

8. The interlock assembly of claim 7, further comprising:
a third arm portion provided on said bell crank member;
wherein said locking arm is configured to selectively engage said third arm portion to substantially limit the movement of said bell crank member; and
wherein said cable is operable to substantially prevent the opening of the selectively openable fuel filler door when said locking arm engages said third arm member.

9. The interlock assembly of claim 7, wherein said cable includes a second end operatively connected to the fuel filler door.

10. The interlock assembly of claim 6, further comprising a torsion spring mounted with respect to said bell crank member and operable to bias said bell crank member to urge said pin into said retracted position.

11. The interlock assembly of claim 6, wherein the body defines a rear jamb, said bracket member being mounted with respect to the rear jamb.

12. A vehicle comprising:
a body;
a selectively openable slidable door slidably mounted with respect to said body;
a selectively openable fuel filler door mounted with respect to said body;
an interlock assembly operatively connected to said fuel filler door, wherein said interlock assembly includes:
a bracket member;
a bell crank member pivotably mounted with respect to said bracket member;
a pin slidably disposed with respect to said bracket member and movable between an extended position and a retracted position;
a locking arm configured to engage said bell crank member to limit the movement of said bell crank member;
wherein said bell crank member is operable to urge said pin into said extended position when said fuel filler door is open and said retracted position when said fuel filler door is closed;
wherein said pin engages a bore defined by said slidable door when said pin is in said extended position to substantially lock the slidable door; and wherein said locking arm engages said bell crank member to substantially prevent the opening of the fuel filler door when the slidable door is open.

13. The vehicle of claim 12, wherein said body defines a rear jamb and wherein said interlock assembly is mounted with respect to said rear jamb.

14. The vehicle of claim 12, wherein the interlock assembly further includes:
 a cable having a first end;
 wherein said bell crank member includes a first arm portion and a second arm portion;
 wherein said first end of said cable is mounted with respect to said first arm portion;
 wherein said second arm portion is engaged with said pin; and
 wherein said cable is operable to bias said bell crank member to urge said pin into said extended position.

15. The vehicle of claim 14, wherein said cable includes a second end operatively connected to said fuel filler door.

16. The vehicle of claim 14, further comprising:
 a third arm portion provided on said bell crank member;
 wherein said locking arm is configured to selectively engage said third arm portion to substantially limit the movement of said bell crank member; and
 wherein said cable is operable to substantially prevent the opening of the fuel filler door when said locking arm engages said third arm member.

* * * * *